US012646788B2

(12) United States Patent
Choi et al.

(10) Patent No.: US 12,646,788 B2
(45) Date of Patent: Jun. 2, 2026

(54) INTEGRATED BATTERY CASE

(71) Applicants:Hyundai Motor Company, Seoul
(KR); Kia Corporation, Seoul (KR)

(72) Inventors: Yong Hwan Choi, Seoul (KR); **Gyung
Hoon Shin**, Seoul (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 661 days.

(21) Appl. No.: 17/985,411

(22) Filed: Nov. 11, 2022

(65) Prior Publication Data

US 2023/0253661 A1      Aug. 10, 2023

(30) Foreign Application Priority Data

Feb. 7, 2022      (KR) ........................ 10-2022-0015593

(51) Int. Cl.
| | |
|---|---|
| *H01M 10/613* | (2014.01) |
| *H01M 10/625* | (2014.01) |
| *H01M 10/6556* | (2014.01) |
| *H01M 50/204* | (2021.01) |
| *H01M 50/24* | (2021.01) |
| *H01M 50/249* | (2021.01) |
(Continued)

(52) U.S. Cl.
CPC ....... *H01M 50/282* (2021.01); *H01M 10/613*
(2015.04); *H01M 10/625* (2015.04); *H01M
10/6556* (2015.04); *H01M 50/204* (2021.01);
*H01M 50/24* (2021.01); *H01M 50/249*
(2021.01); *H01M 50/262* (2021.01); *H01M
2220/20* (2013.01)

(58) Field of Classification Search
CPC ........... H01M 10/613; H01M 10/6556; H01M
50/204
See application file for complete search history.

(56) References Cited

U.S. PATENT DOCUMENTS

| | | | |
|---|---|---|---|
| 9,281,505 | B2 | 3/2016 | Hihara et al. |
| 2020/0152926 | A1 | 5/2020 | Wynn et al. |
(Continued)

FOREIGN PATENT DOCUMENTS

| | | | | |
|---|---|---|---|---|
| CN | 215070133 U | * | 12/2021 | ........ H01M 10/6554 |
| JP | 2012-066773 A | | 4/2012 | |
(Continued)

OTHER PUBLICATIONS

Machine Translation of KR102344152B1. (Year: 2022).*
Office Action issued on Mar. 10, 2026 in Korean Patent Application
No. 10-2022-0015593.

*Primary Examiner* — Jonathan G Jelsma
(74) *Attorney, Agent, or Firm* — Morgan, Lewis &
Bockius LLP

(57)      ABSTRACT

An integrated battery case includes an intermediate panel
provided under a plurality of battery cells and configured to
cool the battery cells; a cooling channel member provided
under the intermediate panel and including channels formed
in an internal space of the cooling channel member; and a
lower cover provided under the cooling channel member,
including a composite material-based double layer to protect
the battery case when a collision occurs in a lower portion
of a vehicle, and integrally connected to the intermediate
panel and the cooling channel member by a plurality of
mounting portions and a through portion.

9 Claims, 7 Drawing Sheets

(51) Int. Cl.
    *H01M 50/262*     (2021.01)
    *H01M 50/282*     (2021.01)

(56)            References Cited

U.S. PATENT DOCUMENTS

| | | | |
|---|---|---|---|
| 2020/0350522 A1* | 11/2020 | Choi | H01M 10/6554 |
| 2021/0296728 A1* | 9/2021 | Kim | B32B 5/08 |
| 2022/0037731 A1 | 2/2022 | Jung et al. | |
| 2024/0021920 A1* | 1/2024 | You | H01M 10/613 |

FOREIGN PATENT DOCUMENTS

| | | | |
|---|---|---|---|
| JP | 2014-080116 A | 5/2014 |
| JP | 2017-222191 A | 12/2017 |
| KR | 10-2020-0033775 A | 3/2020 |
| KR | 10-2020-0127748 A | 11/2020 |
| KR | 10-2021-0060414 A | 5/2021 |
| KR | 10-2344152 B1 | 1/2022 |

* cited by examiner

<A>

<B>

C'       350

<C>

INTEGRATED BATTERY CASE

CROSS REFERENCE TO RELATED APPLICATION

The present application claims priority to Korean Patent Application No. 10-2022-0015593, filed Feb. 7, 2022, the entire contents of which is incorporated herein for all purposes by this reference.

BACKGROUND OF THE PRESENT DISCLOSURE

Field of the Present Disclosure

The present disclosure relates to an integrated battery case, and more particularly, to an integrated battery case, in which not only a composite material-based protection cover is applied but also an optimum design-based rigidity reinforcing structure is added to a lower end portion of a battery lower case, distributing shock transferred to cells for minimizing deformation of the battery case.

Description of Related Art

With a recent global trend of reducing carbon dioxide emissions, there is a significantly increasing demand for an electric vehicle that utilizes electrical energy stored in a battery such as an energy storage device to drive a motor and generate driving power, in place of a typical vehicle that employs an internal-combustion engine to generate driving power through the combustion of fossil fuels.

Thus, interest in the electric vehicle has recently increased, and a high voltage battery mounted to the electric vehicle has been increased in energy capacity required according to vehicle types and vehicle classes. Accordingly, development for optimizing a battery package and a battery structure to secure a battery-mounting space has been conducted.

The high voltage battery of the electric vehicle is placed in a lower portion of the vehicle and may cause a safety problem when the vehicle collides with any object during a drive. Besides, the shock in the lower portion may cause a cooling channel member to be deformed even though the battery cells are not deformed, lowering cooling performance and degrading the durability of the battery cells in the long term. Furthermore, the rigidity of the battery lower case is not high, and the battery case may be broken when a collision occurs in the lower portion of the vehicle, damaging a battery cell or a battery module.

Such a conventional structure where the cooling channel member is provided separately from the battery case reduces the weight and volumetric energy density of the battery case and decreases the battery mounting space, and it is therefore difficult to secure the marketability of the battery case. Accordingly, a method of integrating the battery case and the cooling channel member as a single body has been on the rise.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an integrated battery case, in which not only a composite material-based protection cover is applied but also an optimum design-based rigidity reinforcing structure is added to a lower end portion of a battery lower case, distributing shock transferred to cells and minimizing deformation of the battery case.

According to an exemplary embodiment of the present disclosure, an integrated battery case includes: an intermediate panel provided under a plurality of battery cells and configured to cool the battery cells; a cooling channel member provided under the intermediate panel and including channels formed in an internal space of the cooling channel member; and a lower cover provided under the cooling channel member, including a composite material-based double layer to protect the battery case when a collision occurs in a lower portion of a vehicle, and integrally connected to the intermediate panel and the cooling channel member by a plurality of mounting portions and a through portion.

The intermediate panel may be welded to the cooling channel member.

The lower cover may be connected to the intermediate panel by a first mounting portion using adhesive and bolting connection methods.

The first mounting portion may be formed along the edge portions of the intermediate panel and connect the lower cover and the intermediate panel.

Using an adhesive connection method, the lower cover may be connected to the cooling channel member by a second mounting portion.

The second mounting portion may be formed along a longitudinal direction of the intermediate panel and connect the lower cover and the cooling channel member.

An engraved portion of the lower cover may adhere to an embossed portion of the cooling channel member.

The through portion may include a bushing portion and a head portion, and the lower cover and the intermediate panel may be connected by the bushing portion using an adhesive connection method around the mounting portion and by the head portion using a bolting connection method.

The head portion may be hidden inside a side member and is provided to penetrate the lower cover and the intermediate panel for connection.

The double-layer may include a composite material including long fiber and continuous fiber.

The long fiber may be disposed outside the battery case, and the continuous fiber may be disposed inside the battery case.

The long fiber may be thicker than the continuous fiber.

The intermediate panel, the cooling channel member and the lower cover may form a load path when the collision occurs in the lower portion of the vehicle.

The integrated battery case may further include a reinforcing rib that forms a reinforcing structure for connecting the plurality of mounting portions and the through portion to support the lower cover.

The reinforcing rib 400 may include a continuous fiber.

In an integrated battery case, according to the present disclosure, not only a composite material-based protection cover is applied but also an optimum design-based rigidity reinforcing structure is added to a lower end portion of a battery lower case, distributing shock transferred to cells and minimizing deformation of the battery case. The battery is effectively protected from shock in the lower portion thereof and secures stability at high voltage. Furthermore, a conventional lower case separately provided is removable, decreasing the weight of the battery and reducing the cost of materials.

The effects obtainable from the present disclosure are not limited to those mentioned above, and other effects not mentioned above will be apparent to a person having ordinary knowledge in the art, to which the present disclosure pertains, from the following descriptions.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
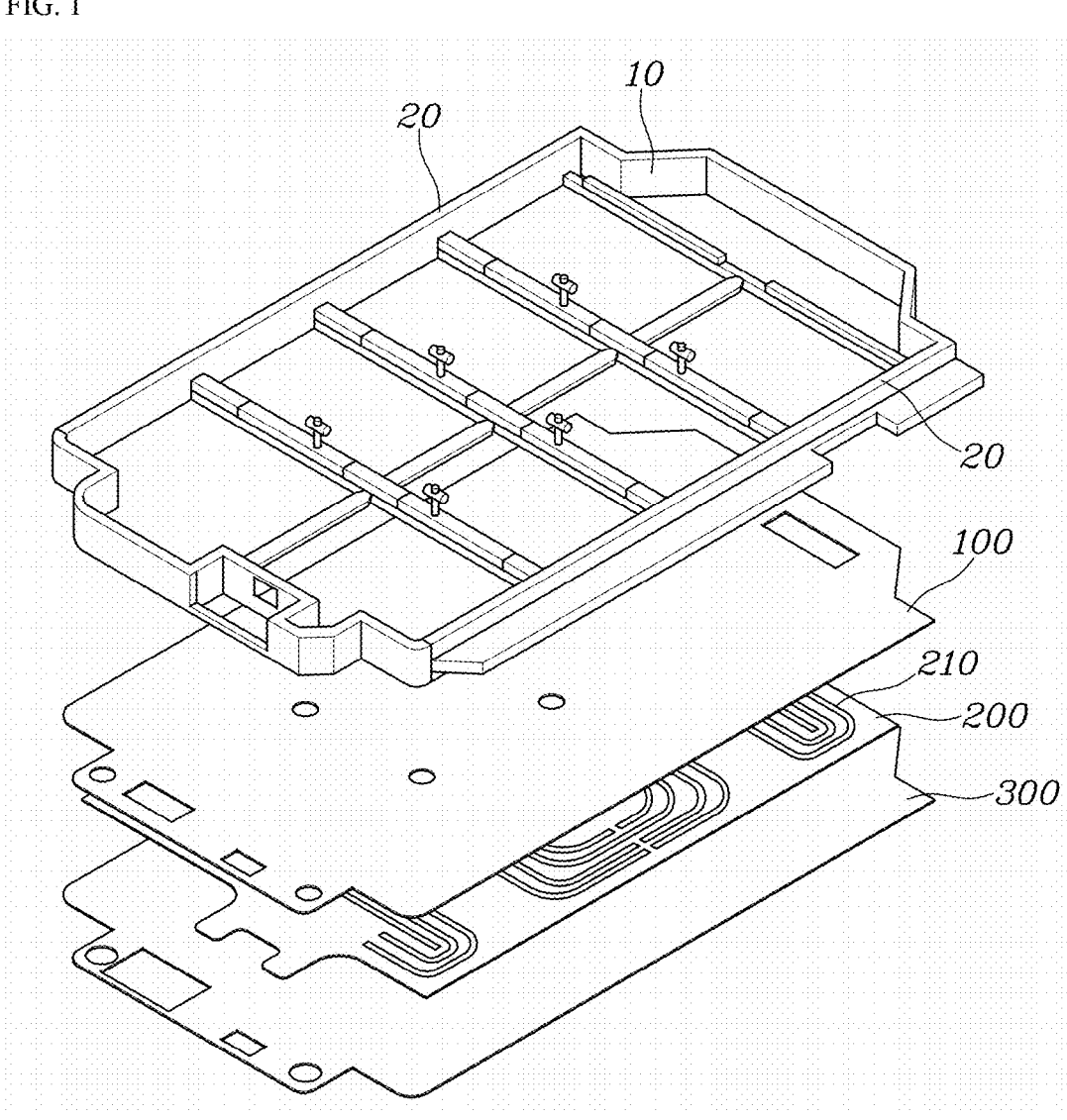
FIG. 1 is a view exemplarily illustrating an integrated battery case according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Regarding embodiments of the present disclosure included in the present specification or application, the specific structural or functional description is merely illustrative for describing the embodiments of the present disclosure, and embodiments of the present disclosure may be implemented in various forms but not be construed as being limited to the embodiments set forth in the present specification or application.

Because the embodiments of the present disclosure may be variously modified and have various forms, specific exemplary embodiments will be illustrated in the drawings and described in detail in the present specification or application. However, it may be understood that embodiments of the present disclosure are intended not to be limited to the specific embodiments but to cover all modifications, equivalents or alternatives without departing from the spirit and technical scope of the present disclosure.

Unless defined otherwise, all terms used herein including technical or scientific terms have the same meanings as those generally understood by a person having ordinary knowledge in the art to which the present disclosure pertains. The terms such as those defined in generally used dictionaries are construed to have meanings matching that in the context of related technology, and unless clearly defined otherwise, are not construed to be ideally or excessively formal.

Below, the present disclosure will be described in detail by describing embodiments with reference to the accompanying drawings. Like reference numerals in the drawings refer to like numerals.

Figure 2:
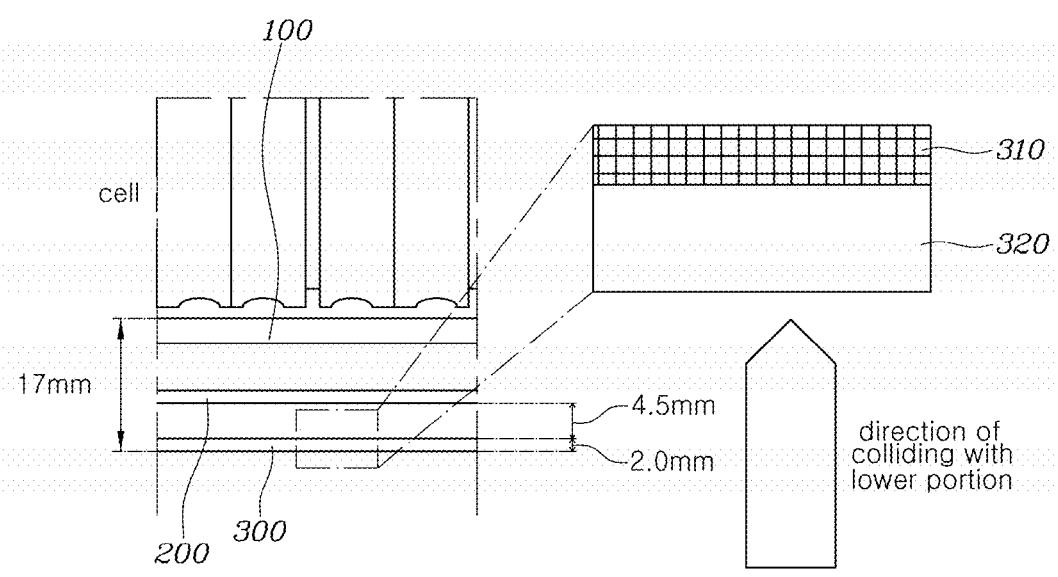
FIG. 2 is a view exemplarily illustrating a composite material-based double layer formed in a lower cover.
Figure 3:
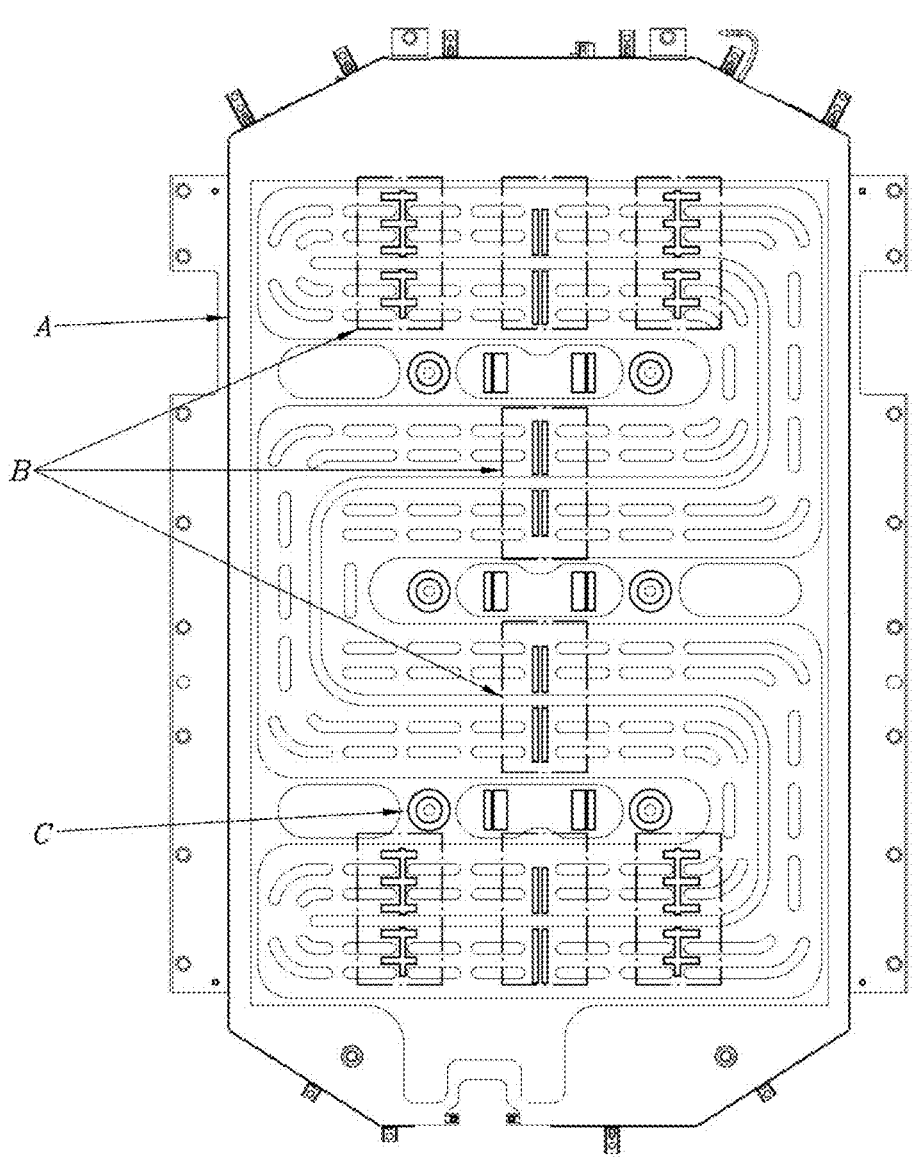
FIG. 3 is a view exemplarily illustrating a first mounting portion, a second mounting portion, and a through portion by which a lower cover is connected to an intermediate panel and a cooling channel member as a single body.
Figure 4:
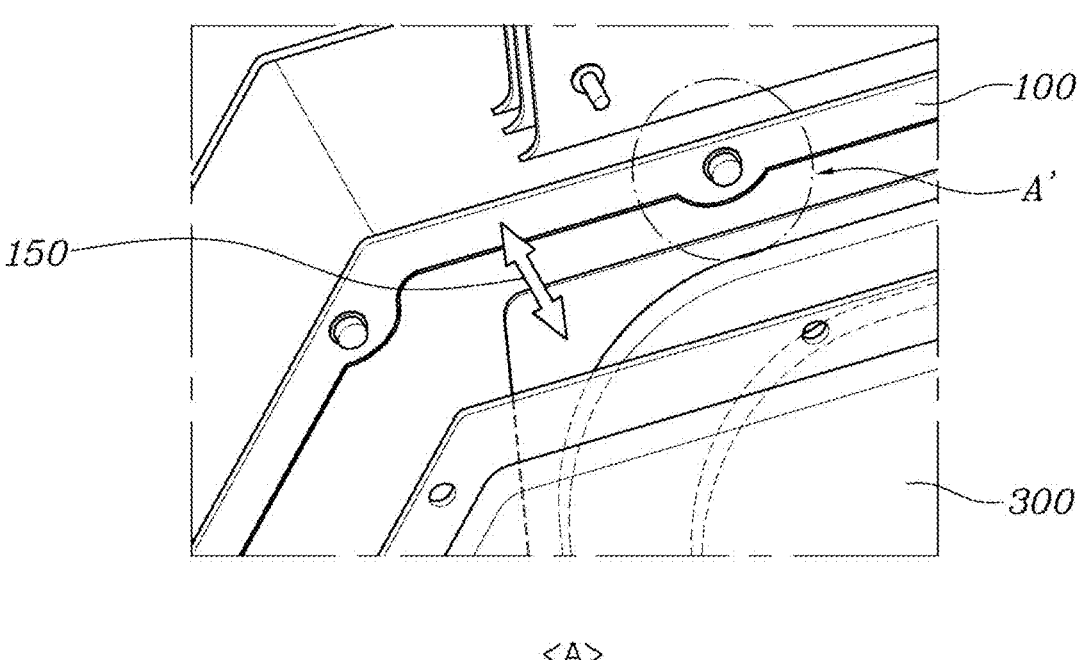
FIG. 4 is a view exemplarily illustrating a first mounting portion by which a lower cover and an intermediate panel are connected.
Figure 5:
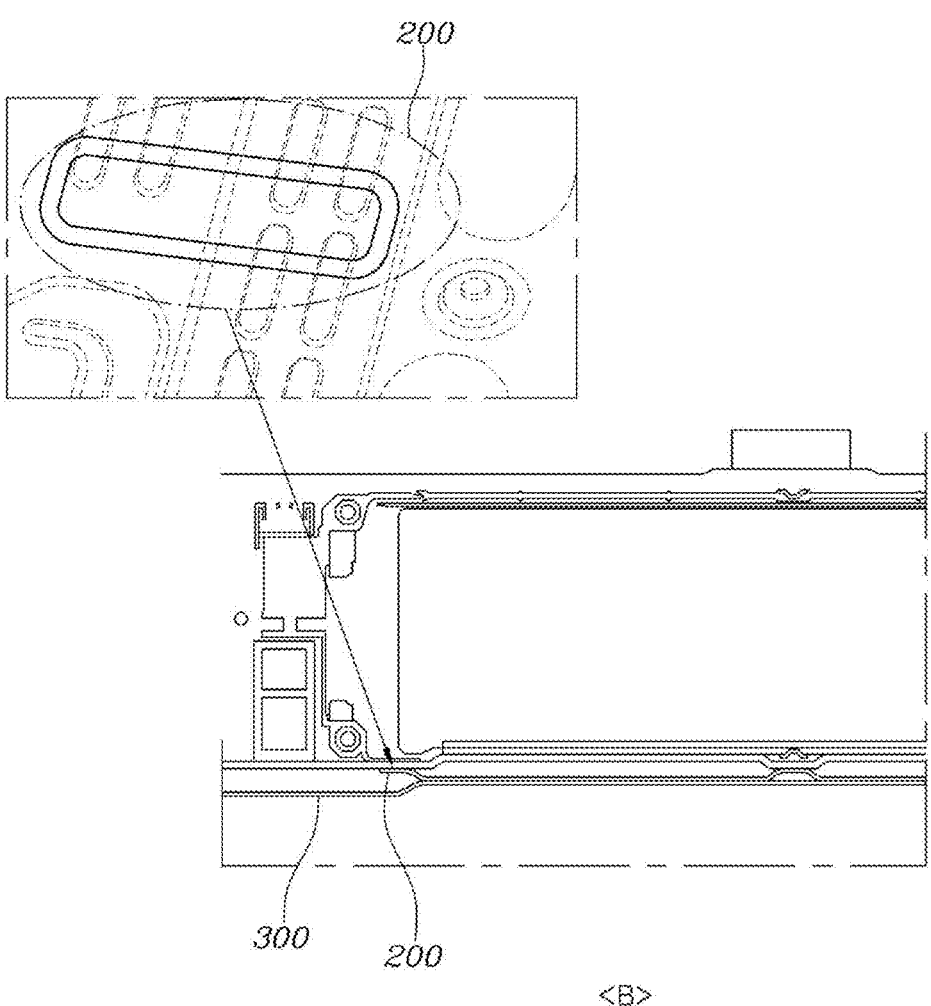
FIG. 5 is a view exemplarily illustrating a second mounting portion by which a lower cover and a cooling channel member are connected.
Figure 6:
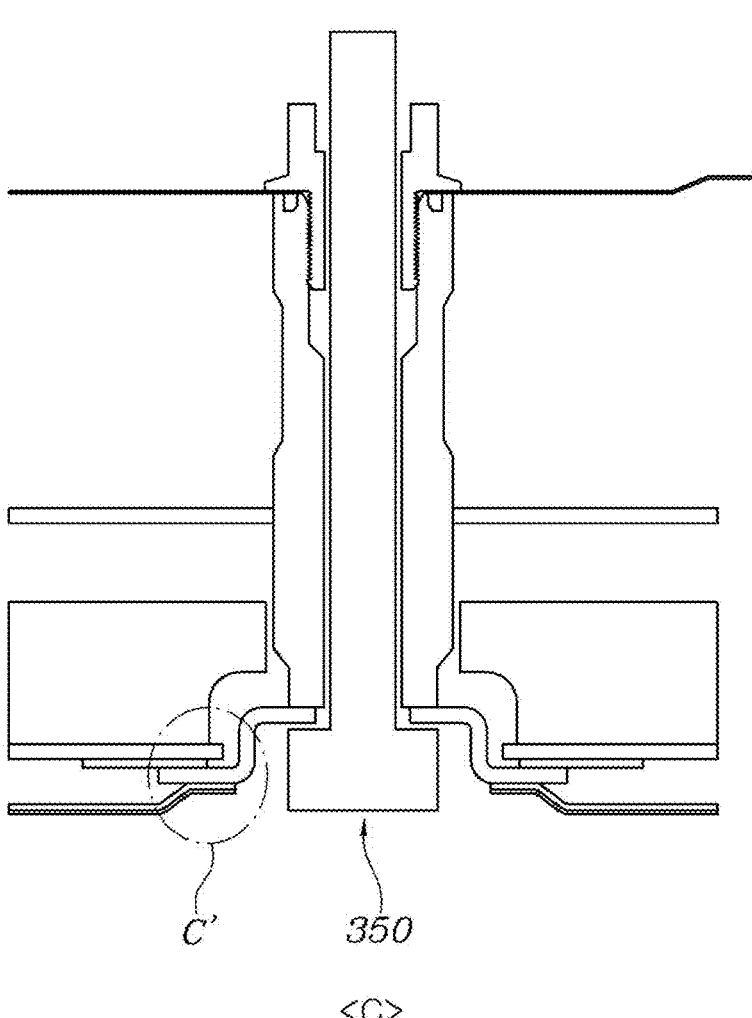
FIG. 6 is a view exemplarily illustrating a through portion through which a lower cover and an intermediate panel are connected.
Figure 7:
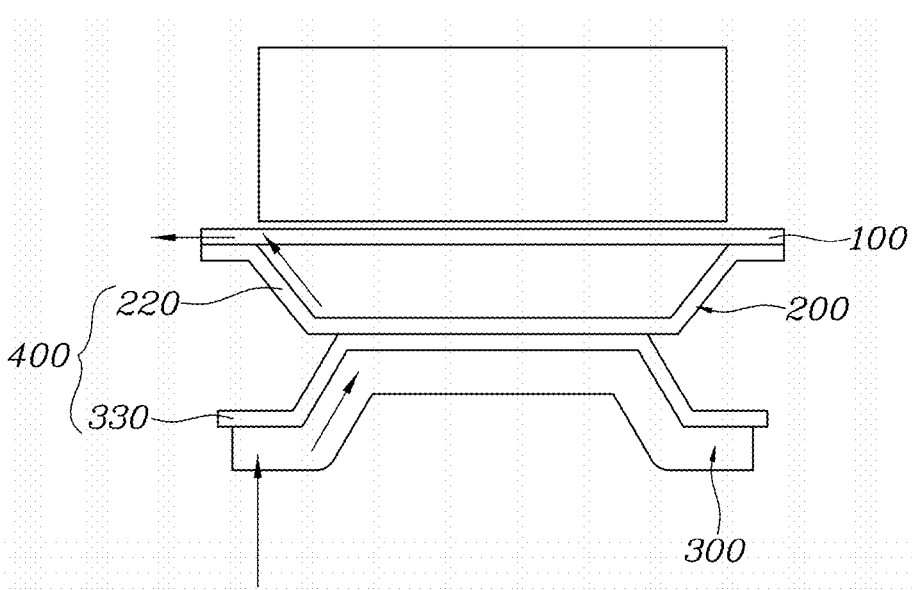
FIG. 7 is a view exemplarily illustrating a load path in an intermediate panel, a cooling channel member, and a lower cover formed when a collision occurs in a lower portion of a vehicle.

FIG. 1 is a view exemplarily illustrating an integrated battery case according to an exemplary embodiment of the present disclosure. FIG. 2 is a view exemplarily illustrating a composite material-based double layer formed in a lower cover. FIG. 3 is a view exemplarily illustrating a first mounting portion, a second mounting portion, and a through portion by which a lower cover is connected to an intermediate panel and a cooling channel member as a single body. FIG. 4 is a view exemplarily illustrating a first mounting portion by which a lower cover and an intermediate panel are connected. FIG. 5 is a view exemplarily illustrating a second mounting portion by which a lower cover and a cooling channel member are connected. FIG. 6 is a view exemplarily illustrating a through portion through which a lower cover and an intermediate panel are connected. FIG. 7 is a view exemplarily illustrating a load path in an intermediate panel, a cooling channel member, and a lower cover formed when a collision occurs in a lower portion of a vehicle.

FIG. 1 is a view exemplarily illustrating an integrated battery case according to an exemplary embodiment of the present disclosure.

Referring to FIG. 1, an integrated battery case includes an intermediate panel 100 provided under a plurality of battery cells and cooling the battery cells; a cooling channel member 200 provided under the intermediate panel 100 and formed with channels 210 in an internal space of the cooling channel member; and a lower cover 300 provided under the cooling channel member 200, formed with a composite material-based double layer to protect the battery case when a collision occurs in a lower portion of a vehicle, and integrally connected to the intermediate panel 100 and the cooling channel member 200 by a plurality of mounting portions and a through portion C.

In the structure according to the present disclosure, not only a protection cover formed with the composite material-based double layer is applied but also an optimum design-based rigidity reinforcing structure is added to a lower end portion of a battery lower case, distributing shock transferred to cells, minimizing deformation of the battery case, and reducing the cost of materials.

When a collision occurs in a lower portion of the electric vehicle, the cooling channel member may be deformed even though the high voltage battery cells mounted to the lower portion of the vehicle are not deformed, lowering cooling performance and thus decreasing the durability of the battery cells in the long term. Furthermore, the battery case may be broken due to external shock, damaging the battery cell or a battery module.

Therefore, in consideration of collision characteristics in the lower portion of the battery case, the lower cover 300 includes a composite material of a predetermined mixing ratio, and a reinforcing rib 400 connected to a fastening portion of the battery case is provided to reinforce the lower portion of the battery case.

To the present end, the cooling channel member 200 is provided between the intermediate panel 100 and the lower cover 300 and integrated into the battery case to secure the performance of protecting the lower portion from a collision and reduce weight and the structure of the lower cover 300 needs to be optimized for the reinforcing rib 400.

The intermediate panel 100 is provided under the plurality of battery cells and cools the battery cells. The intermediate panel 100 is disposed directly under a battery module mounting space 10 for storing energy, is in direct contact with the battery cells, and is configured to lower the temperature of the battery cell through the cooling channel member 200.

Furthermore, the intermediate panel 100 is connected to the cooling channel member 200 by welding. The battery cell may be cooled by the channels formed in the internal space of the cooling channel member 200 and the intermediate panel 100.

Furthermore, a space between the cooling channel member 200 and the intermediate panel 100 may be hermetically sealed because the cooling channel member 200 and the intermediate panel 100 are welded to cool the battery cell by the channel formed in the internal space of the cooling channel member 200 together with the intermediate panel 100.

Furthermore, the lower cover 300 is provided under the cooling channel member 200, includes the composite material-based double layer to protect the battery case when a collision occurs in the lower portion of the vehicle, and is integrally connected to the intermediate panel 100 and the cooling channel member 200 by the plurality of mounting portions and the through portion C.

As shown in FIG. 3, FIG. 4, FIG. 5 and FIG. 6, the lower cover 300, the intermediate panel 100, and the cooling channel member 200 are integrally connected. FIG. 3 is a view exemplarily illustrating a first mounting portion A, a second mounting portion B, and the through portion C by which the lower cover 300 is integrally connected to the intermediate panel 100 and the cooling channel member 200, and FIG. 4 is a view exemplarily illustrating the first mounting portion A by which the lower cover 300 and the intermediate panel 100 are connected.

The lower cover 300 may be connected to the intermediate panel 100 by the first mounting portion A using an adhesive connection method 150 and a bolting connection method A'. To connect the lower cover 300 and the existing battery case, there is a need to connect the intermediate panel 100 and the lower cover 300.

Furthermore, the lower cover 300 and the intermediate panel 100 are connected by the first mounting portion A at a side member 20. The first mounting portion A may be formed along the edge portions of the intermediate panel 100 and connect the lower cover 300 and the intermediate panel 100.

Because the space between the lower cover 300 and the intermediate panel 100 is narrow but does not need to satisfy an airtight condition, the adhesive connection method 150 may be used for the connection. When the adhesive connection method 150 is used together with the bolting connection method A', the fastening force is more strengthened, and the lower cover 300 is more prevented from coming off than those when only the adhesive connection method 150.

In the instant case, a bolting space of 100 mm or less is required when only the bolting connection method A' is used for connecting the lower cover 300 and the intermediate panel 100, increasing the weight and material cost of the overall battery case. Furthermore, a space for a width of 20 mm is very narrow when only the adhesive connection method 150 is used for connecting the lower cover 300 and the intermediate panel 100, lowering the coupling performance between the lower cover 300 and the intermediate panel 100.

FIG. 5 is a view exemplarily illustrating the second mounting portion B by which the lower cover 300 and the cooling channel member 200 are connected.

Referring to FIG. 5, the lower cover 300 may be connected to the cooling channel member 200 by the second mounting portion B using the adhesive connection method 150. The second mounting portion B is formed in a central adhesive portion related to a layout structure of the cooling channel member 200. The second mounting portion B is formed in the longitudinal direction of the intermediate panel 100, connecting the lower cover 300 and the cooling channel member 200.

The connection between the lower cover 300 and the cooling channel member 200 maintains an airtight condition like the connection between the cooling channel member 200 and the intermediate panel 100. To the present end, the connection between the lower cover 300 and the cooling channel member 200 using the second mounting portion B is required to have a large area.

For the large areal connection between the lower cover 300 and the cooling channel member 200, the second mounting portion B using the adhesive connection method 150 is needed, and an engraved portion of the lower cover 300 meshes with an embossed portion of the cooling channel member 200 by the adhesive connection method 150 to thereby satisfy the airtight condition for cooling the battery cells.

FIG. 6 is a view exemplarily illustrating the through portion C through which the lower cover 300 and the intermediate panel 100 are connected.

Referring to FIG. 6, the through portion C may include a bushing portion C' and a head portion 350. To connect the lower cover 300 and the intermediate panel 100, the bushing portion C' may use the adhesive connection method 150 around the mounting portion, and the head portion 350 may use the bolting connection method A'. Because the intermediate panel 100 and the lower cover 300 are connected by the bolting connection method A', the head portion 350 may be hidden inside the side member 20 to form a protective structure for preventing the through portion C from damage for stability, and penetrating the lower cover 300 and the intermediate panel 100 for the connection.

Furthermore, the bushing portion C' is attached around the second mounting portion B by adhesive, the lower cover 300 has a structure of protruding more than the head portion 350 of the through portion C, and the head portion 350 is hidden in the side member 20. As the head portion 350 is concealed inside the side member 20, the internal is improved in marketability.

FIG. 2 is a view exemplarily illustrating a composite material-based double layer formed in the lower cover 300.

Referring to FIG. 2, the double layer may include a composite material made up of long fiber 320 and continuous fiber 310. The continuous fiber 310 that prevents penetration in a large area is necessary for improving penetration-preventing performance. However, when the continuous fiber 310 is thickly applied, a problem may arise in that cost of materials increases and moldability deteriorates.

Therefore, the long fiber 320 for supplementing the continuous fiber 310 is disposed outside the battery case, and the continuous fiber 310 may be disposed inside the battery case. With such a patterned layout of the continuous fiber 310 and the long fiber 320, the maximum performance is secured even with a small amount of continuous fiber 310.

When the continuous fiber 310 is disposed outside and under the battery case, the continuous fiber 310 may be broken as shock is absorbed through a narrow area and the penetration preventing performance deteriorates. Therefore, the continuous fiber 310 is inside and on the battery case, absorbing a shock through a large area in the lower portion of the battery case and maximizing the penetration preventing performance. The maximum penetration-preventing performance may be achieved by making the long fiber 320 thicker than the continuous fiber 310, which effectively reduces the material cost.

FIG. 7 is a view exemplarily illustrating a load path in the intermediate panel 100, the cooling channel member 200, and the lower cover 300, formed when a collision occurs in the lower portion of a vehicle, in which the intermediate panel 100, the cooling channel member 200, and the lower cover 300 may form a load path when the collision occurs in the lower portion of the vehicle.

The embossed portion 220 of the cooling channel member formed by the cooling channel member 200 meshes with the engraved portion 330 of the lower cover 300 to form the load path as shown in FIG. 7, allowing the lower cover 300 to scope with shock in the lower portion stably.

Furthermore, the reinforcing rib 400 may be provided to form a reinforcing structure for connecting the plurality of mounting portions and the through portion C and supporting the lower cover 300. The reinforcing rib 400, which is configured to reinforce the rigidity of the lower cover 300 by connecting fastening points including the first mounting portion A, the second mounting portion B, and the through portion C, may be used for connection between the first mounting portions A, connection between the second mounting portions B, and connection between the through portions C.

Furthermore, the thickness of the reinforcing rib 400 may be set by taking a distance from the cooling channel member 200 into account. Considering the moldability, the width of the reinforcing rib 400 may be greater than the thickness of the reinforcing rib 400, which is optimized with reference to collision analysis results from the collisions in the lower portion. Furthermore, the reinforcing rib 400 may be made of the continuous fiber 310 to support the lower cover 300.

In an integrated battery case according to the present disclosure, not only a composite material-based protection cover is applied but also an optimum design-based rigidity reinforcing structure is added to a lower end portion of a battery lower case, distributing shock transferred to cells and minimizing deformation of the battery case. With this, the battery is effectively protected from shock in the lower portion thereof and secures stability at high voltage. Furthermore, a conventional lower case separately provided is removable, decreasing the weight of the battery and reducing the cost of materials.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An integrated battery case comprising:
   an intermediate panel provided under a plurality of battery cells and configured to cool the battery cells;
   a cooling channel member provided under the intermediate panel and including channels formed in an internal space of the cooling channel member; and
   a lower cover provided under the cooling channel member, including a composite material-based double layer to protect the battery case when a collision occurs in a lower portion of a vehicle, and integrally connected to the intermediate panel and the cooling channel member by a plurality of mounting portions and a through portion,
   wherein the double layer includes a composite material including long fiber and continuous fiber, the long fiber is disposed outside the battery case, the continuous fiber is disposed inside the battery case, and the long fiber is thicker than the continuous fiber,
   wherein an engraved portion of the lower cover meshes with an embossed portion of the cooling channel member to form a load path from the lower cover through the cooling channel member to the intermediate panel when the collision occurs in the lower portion of the vehicle,
   wherein the integrated battery case further includes a reinforcing rib that forms a reinforcing structure for connecting the plurality of mounting portions and the through portion to support the lower cover,
   wherein the reinforcing rib is formed by the engraved portion of the lower cover and the embossed portion of the cooling channel member, and
   wherein the reinforcing rib includes a continuous fiber.

2. The integrated battery case of claim 1, wherein the intermediate panel is welded to the cooling channel member.

3. The integrated battery case of claim 1, wherein the lower cover is connected to the intermediate panel by a first mounting portion using an adhesive connection method and a bolting connection method.

4. The integrated battery case of claim 3, wherein the first mounting portion is formed along edge portions of the intermediate panel and connects the lower cover and the intermediate panel.

5. The integrated battery case of claim 1, wherein the lower cover is connected to the cooling channel member by a second mounting portion using an adhesive connection method.

6. The integrated battery case of claim 5, wherein the second mounting portion is formed along a longitudinal direction of the intermediate panel and connects the lower cover and the cooling channel member.

7. The integrated battery case of claim 1, wherein the through portion includes a bushing portion and a head portion, and the lower cover and the intermediate panel are connected by the bushing portion using an adhesive connection method around the mounting portions and by the head portion using a bolting connection method.

8. The integrated battery case of claim 7, wherein the head portion is hidden inside a side member and is provided to penetrate the lower cover and the intermediate panel for connection.

9. The integrated battery case of claim 7, wherein the lower cover protrudes more than the head portion of the through portion.

* * * * *